United States Patent
Can et al.

(10) Patent No.: US 10,684,944 B1
(45) Date of Patent: Jun. 16, 2020

(54) MANAGING DATA ACCESSES IN STORAGE SYSTEMS

(75) Inventors: Khang Can, Framingham, MA (US); Qin Tao, Hopkinton, MA (US); Xiangping Chen, Shrewsbury, MA (US); Siyu Zhou, Holliston, MA (US); Sadagopan Balaraman, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/570,827

(22) Filed: Aug. 9, 2012

(51) Int. Cl.
 *G06F 12/02* (2006.01)
 *G06F 9/50* (2006.01)

(52) U.S. Cl.
 CPC ............ *G06F 12/02* (2013.01); *G06F 9/5083* (2013.01)

(58) Field of Classification Search
 CPC ...... G06F 3/0635; G06F 3/0647; G06F 12/08; G06F 12/02; G06F 9/5083; G06F 9/5089
 See application file for complete search history.

(56) References Cited

U.S. PATENT DOCUMENTS

| | | | |
|---|---|---|---|
| 7,185,156 B2 * | 2/2007 | Fujibayashi et al. | 711/161 |
| 8,429,346 B1 * | 4/2013 | Chen et al. | 711/114 |
| 8,645,654 B1 * | 2/2014 | Bailey et al. | 711/165 |
| 2010/0281230 A1 * | 11/2010 | Rabii et al. | 711/165 |

* cited by examiner

*Primary Examiner* — Aracelis Ruiz
(74) *Attorney, Agent, or Firm* — Krishnendu Gupta; Dorothy Wu Chiang

(57) ABSTRACT

A method is used in managing data accesses in storage systems. An access path to a storage object is evaluated. The storage object is associated with a first storage processor of a storage system for providing access to the storage object. The storage object is accessed using a second storage processor of the storage system. The storage system includes source and destination storage pools configured such that performance characteristics associated with the source storage pool is different from performance characteristics associated with the destination storage pool. The storage object resides in the source storage pool associated with the first storage processor. Based on the evaluation, the access path of the storage object is changed to the second storage processor based on a policy. The policy determines available storage space in the destination storage pool associated with the second storage processor for migrating the storage object to the destination storage pool.

18 Claims, 10 Drawing Sheets

MANAGING DATA ACCESSES IN STORAGE SYSTEMS

CROSS REFERENCE TO RELATED APPLICATIONS

This application is related to co-pending U.S. patent application Ser. No. 13/570,912 entitled MANAGING DATA ACCESSES IN STORAGE SYSTEMS filed on Aug. 9, 2012, which is incorporated herein by reference.

BACKGROUND

Technical Field

This application generally relates to managing data accesses in storage systems.

Description of Related Art

A traditional storage array (herein also referred to as a "data storage system", "disk storage array", "disk array" or simply "array") is a collection of hard disk drives operating together logically as a unified storage device. Storage arrays are designed to store large quantities of data. Storage arrays typically include one or more storage array processors (SPs), for handling requests for allocation and read or write access requests to a physical storage device, also known as Input/Output ("I/O") access requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier").

Data may be referred to as having a tiering preference. Tiering preferences may be based upon storage disk capacity, performance, or extreme performance. Tiering preferences may be categorized as high, low, automatic, or no movement. A high tiering preference generally relates to the user's preference that allocated storage reside on the high tier. A low tiering preference generally relates to the user's preference that allocated storage reside on the low tier. Automatic tiering preference generally means the user defaults to the system automatically allocating storage space based on criteria, e.g., email application data or other application data. No movement tiering preference refers to the user's preference that the allocated storage remains on the same tier as initially allocated.

Data may be referred to as having a temperature. For example, often referenced data is referred to as having a hot temperature, and less often referenced data is referred to as cold data. Over time, data may be said to have a change in temperature, for example, when formerly hot data is now rarely accessed, the data changes its temperature and is referred to as cold data.

It may be possible to have different tiers with different properties or constructed from a mix of different types of physical disks to achieve a performance or price goal. Storing hot data on the fast tier and cold data on the slow tier may create a more favorable customer cost profile than storing all data on a single kind of disk.

A storage tier may be made up of different types of disks, i.e., disks with different redundant array of inexpensive disks ("RAID") levels, performance and cost characteristics. In the industry, several levels of RAID systems have been defined. RAID parity schemes may be utilized to provide error detection during the transfer and retrieval of data across a storage system.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units ("LUs" or "LUNs") or logical volumes ("LVs"). This allows a unified storage array to appear as a collection of separate file systems, network drives, and/or volumes.

SUMMARY OF THE INVENTION

A method is used in managing data accesses in storage systems. An access path to a storage object is evaluated. The storage object is associated with a first storage processor of a storage system for providing access to the storage object. The storage object is accessed using a second storage processor of the storage system. The storage system includes source and destination storage pools configured such that performance characteristics associated with the source storage pool is different from performance characteristics associated with the destination storage pool. The storage object resides in the source storage pool associated with the first storage processor. Based on the evaluation, the access path of the storage object is changed to the second storage processor based on a policy. The policy determines available storage space in the destination storage pool associated with the second storage processor for migrating the storage object to the destination storage pool.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Figure 1:
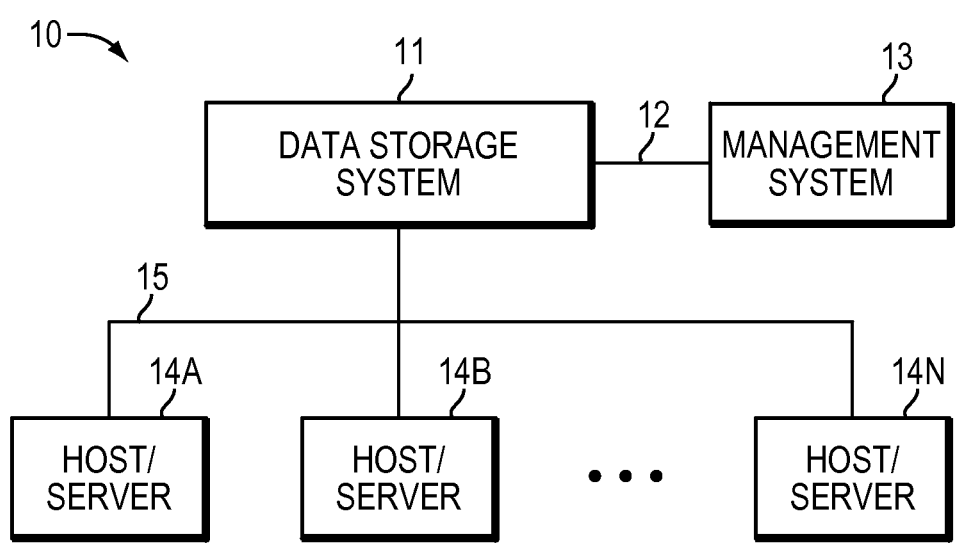
FIG. 1 is an example of an embodiment of a computer system that may utilize the techniques described herein.

Described below is a technique for use in managing data accesses in storage systems, which technique may be used to provide, among other things, evaluating an access path to a storage object, wherein the storage object is associated with a first storage processor of a storage system for providing access to the storage object, where the storage object is accessed using a second storage processor of the storage system, where the storage system includes source and destination storage pools configured such that performance characteristics associated with the source storage pool is different from performance characteristics associated with the destination storage pool, where the storage object resides in the source storage pool associated with the first storage processor, and based on the evaluation, changing the access path of the storage object to the second storage processor based on a policy, where the policy determines available storage space in the destination storage pool associated with the second storage processor for migrating the storage object to the destination storage pool.

A storage pool may be a collection of disks, which may include disks of different types. A storage pool may have the same or different types of storage drives. For example, one embodiment of a storage pool may be a heterogeneous pool, containing many disks with different characteristics of storage disks, such as Enterprise Flash Drives ("EFD") drives, Serial Attached SCSI ("SAS") drives, and other drives. Storage pools of the same type of drives may be subdivided into data slices; for example, a one gigabyte ("GB") data slice may be the allocation element for a logical unit.

As well, a pool may be used synonymously with a storage tier or a set of storage tiers. That is, both a storage tier and a pool may have storage devices of different performance capabilities and costs. A storage pool may contain tiers, such as EFD and SAS drives, or other devices.

As well, both may contain data slices (also referred to as "slices"). A data slice may be considered the smallest element that can be tracked and moved. Generally, overall system performance may be increased by managing logical volumes in such a way that hot data (i.e., accessed frequently or recently) is placed on data slices of a logical volume having higher performance capabilities and by placing cold data on slices of the logical volume having lower performance capabilities. For example, cold data is relocated to low speed disks, such as SAS disks, because the longer I/O latency to access the low speed disk minimally impacts overall storage pool performance, because its access is infrequent. This can lead to a lower cost system having both faster and slower devices that can emulate the performance of a more expensive system having only faster physical devices.

A disk may be a physical disk within the storage system. A LUN may be a logical unit number which is an identifier for a Logical Unit. Each data slice may have a mapping on the location of the physical drive where it starts and ends; a data slice may be sliced again.

Data slice relocation (herein also referred to as a "data relocation" or "data migration") is a process of determining optimal or near optimal data placement among storage objects (e.g., storage tier, RAID groups ("RGs") based on I/O load of the storage objects). Data slice relocation helps provide a way to determine respective preferable or best storage locations of data slices within a LUN in a storage pool, and to construct a data slice relocation candidate list to move data slices from their current locations to the respective preferable or best locations. Data migration, i.e., the moving of data from one storage element to another, may be performed at the LUN level or at the data slice level. Data migration at the data slice level may be performed by copying the data slice and then updating an address map of the data slice with the new location of the data slice.

Within a storage pool, mapped logical volumes (also referred to herein as "MLUs") are created from traditional logical volumes (such as logical units ("LUNs"). MLUs may be within the same drive types or across different drive types, such as EFD and SAS drives. Such a mapping allows the benefit of having some high speed and low speed storage within the same pool. Typically, the high speed storage is more costly, thus, the user obtains the benefit of some high speed storage, without the cost of purchasing exclusively high speed storage.

Generally, data slices are allocated to LUNs in a storage pool as "best-fit" at initial allocation time. In at least some cases, since the I/O load pattern of a slice is not known at initial allocation time, the performance capability of slice storage allocated may be too high or too low for effective data accesses of a slice. Furthermore, data accesses patterns generally tend to change over time. Generally, older data is accessed less frequently and therefore, in many cases does not require storage with a higher performance capability. Temperature of each data slice is an indication of hotness of a slice, i.e., frequency and recency of slice I/Os. Better overall system performance can be achieved by placing hot data slices in a higher tier and cold data slices in a lower tier.

Generally, a storage pool user may select a tier for data slices. This selection is known as a tiering preference. Users can select various tiering preferences, such as the highest tiering preference, the lowest tiering preference, automatic, or no movement for data slices. Storage pool performance may be improved by relocating all data slices on a high speed tier. However, while high speed disks are faster when compared to low speed disks, high speed disks are typically much more expensive and have smaller amounts of storage space.

Generally, a host visible logical volume (such as mapped logical volume ("MLU")) may have data distributed across multiple SPs of a data storage system. Generally, a storage object (such as a slice) of a host visible logical volume that may reside on any one of the storage processors of a data storage system such that the storage object may be accessed by any one of the storage processors of the data storage system. Generally, a data relocation management process (e.g., a policy engine ("PE")) enables a storage system to relocate data by managing I/O statistics on data slices of LUNs, calculating the temperature of the data slices, and tracking tiering preferences of the data slices. Thus, a PE makes decisions regarding a data slice, e.g., whether a data storage system would benefit from relocating the data slice and if so, where the data slice should be relocated. Such relocation decisions may be based on several factors, e.g., the temperature of the data slice, the tiering preferences of the data slice, and the data storage availability. High speed tiers improve I/O performance by reducing access latency of data. Generally, the PE typically performs data relocation on a time interval, for example, every hour. Each time the data relocation is performed, an updated temperature of the data slices and a relocation forecast is provided to the PE.

Conventionally, during the initial storage space allocation, when there is no storage space available that is associated with a local SP, the storage space for a host visible logical volume is allocated from a remote SP, instead. In such an example, the remote SP may be referred to as the owner of the storage space. Thus, in such a conventional system, an I/O access to a data slice located on a remote SP experiences an extra data transfer between SPs of a data storage system, which stresses the inter-processor connection, consumes additional system resources and prolongs the response time for the I/O access. As a result, in such a conventional system, overall system performance is degraded.

Further, conventionally, the PE refers to a fixed set of policies, such as temperature of a data slice and tiering preferences, to determine which data slice to relocate or not. Further, in such a conventional system, the PE does not take into account SP ownership of a data slice when relocating the data slice. Thus, in such a conventional system, the access to a data slice may result in using an SP that is different than the SP that has received an I/O access request (also referred to as a data access request).

By contrast, in at least some implementations in accordance with the current technique as described below, SP ownership is included in the data relocation decisions of data slices of a storage system. In at least one embodiment utilizing the current technique, the data relocation management utilizes a flexible policy which localizes data storage to an SP that serves data access requests to the data storage, referred to as a local SP. The local SP is also referred to as the owner of the storage data. Further, in at least one embodiment, the flexible policy is used to decide whether to relocate storage by making tradeoffs, e.g., between an optimal access path such that a storage object is accessed from the same storage processor at which the storage object resides, or optimal storage media utilizing the highest performing storage.

For example, in accordance with the current technique as described below, a data slice selected for relocation is evaluated to determine which SP is associated with a LUN (e.g., Flare LUN or "FLU") which contains the data slice and ownership of the data slice such that the logical portion of data storage referred to as a mapped logical unit ("MLU") to which the data slice belongs are aligned; i.e., by aligning the ownership of a data slice to an SP that receives a data access request to the mapped logical unit including that data slice, which is achieved by deploying a new flexible policy that localizes data storage to the SP that serves the data access requests. In at least one implementation, a data slice is only relocated if available storage is aligned with the same SP that serves the data access request. In another implementation, in accordance with the current technique, a data slice may be relocated to storage aligned with an SP that is not aligned with the SP that serves the data access request, known as the remote SP, after determining that there is no storage space available with the local SP that serves the data access request, based on flexible PE policies, e.g., SP alignment, temperature of the data slice, tiering preferences of the data slice, and the speed of the physical device. In at least some implementations, in accordance with the current technique, a data slice is relocated in phases, with each phase applying different, dynamic PE policies.

In at least one embodiment, in accordance with the current technique, for example, a relocation data candidate list is generated based on a flexible set of policies, e.g., with dynamic flexibility and timely adjustment capabilities. During the data relocation evaluation, decisions are made by the PE, e.g., whether to relocate a data slice and where to relocate the data slice. In at least one embodiment, a phased relocation approach adjusts the data slice relocation to the appropriate tier and conditionally allows the data slice to move to data storage associated with a non-localized SP or remote SP, e.g., when resulting performance impacts are minimal.

Thus, in at least one embodiment using the current technique, by factoring storage processor ownership in the relocation process, data relocation to data storage associated with remote SPs may be minimized. By minimizing the amount of data located on a remote SP's data storage, access latency may be minimized. However, when the only available storage space on a preferred storage tier belongs to a remote SP, a phased relocation mechanism with flexible policies may determine whether to allow the relocation to proceed, and may determine during which phase to allow the relocation to proceed, if at all, in order to achieve more performance gain to the storage system.

In at least one embodiment, the current technique illustrates that data relocation is based upon a three-phased relocation decision process. For example, initially, a data relocation analysis process generates a data relocation candidate list. In one embodiment, during the first phase, a candidate list data slice is only relocated if data storage is available in data storage owned by the local SP. Any relocation failure due to a lack of space from the local SP's data storage is placed on a candidate retry list, e.g., List A. An empty data slice is occupied by the relocated data slice from the data relocation candidate list, and the formerly occupied data slice location becomes an empty data slice, potentially available for another data slice on the candidate list. In at least some embodiments, empty data slices are created when the first phase relocates data slices and those empty data slices become available for use in second and third phases of the relocation process.

In at least some embodiments, after all data from the first candidate list have been processed, the second phase begins. During the second phase, an attempt to relocate the data from the candidate retry list, List A, occurs. Data storage relocation to a data slice misaligned with a remote SP may be allowed, based on additional data storage criteria, e.g., data slices relocating to a high speed tier, or data slices with a low I/O access rate. The performance gain by relocating data to higher speed drives outweighs the performance impact from inter-processor communication overhead. Additionally, low I/O access rates for data on remote processors introduces minimal inter-processor communication overhead, resulting in negligible performance degradation. During the second phase, any relocation failure due to a lack of data storage availability aligned with the local SP may be placed on a candidate retry list, e.g., List B.

After all the candidates for data relocation from List A have been processed, a third phase begins. During the third phase, an attempt to relocate the candidates for data relocation from List B occurs. Again, data storage relocation to a data storage owned by a remote SP is allowed, based on data storage criteria, such as e.g., data storage on a high speed tier, or data storage with a low I/O access rate. In at least some embodiments, some of the candidates on List B are not relocated during that relocation cycle. The relocation process begins again in Phase 1 during the next relocation cycle, which may occur on a timed interval basis, e.g., nightly or once per day.

Referring to FIG. 1, shown is an example of an embodiment of a computer system that may be used in connection with performing the technique or techniques described herein. The computer system 10 includes one or more data storage systems 11 connected to host systems 14A-14N through communication medium 15. The computer system 10 also includes a management system 13 connected to one or more data storage systems 11 through communication medium 12. In this embodiment of the computer system 10, the management system 13, and the N servers or hosts 14A-14N may access the data storage systems 11, for example, in performing I/O operations, data access requests, and other operations. The communication medium 15 may be any one or more of a variety of networks or other type of communication connections as known to those skilled in the art. Each of the communication mediums 15 and 12 may be a network connection, bus, and/or other type of data link, such as a hardwire or other connections known in the art. For example, the communication medium 15 may be the Internet, an intranet, network or other wireless or other hardwired connection(s) by which the host systems 14A-14N may access and communicate with the data storage systems 11, and may also communicate with other components (not shown) that may be included in the computer system 10. In one embodiment, the communication medium 12 may be a LAN connection and the communication medium 15 may be an iSCSI or fibre channel connection.

Each of the host systems 14A-14N and the data storage systems 11 included in the computer system 10 may be connected to the communication medium 15 by any one of a variety of connections as may be provided and supported in accordance with the type of communication medium 15. Similarly, the management system 13 may be connected to the communication medium 12 by any one of variety of connections in accordance with the type of communication medium 12. The processors included in the host systems 14A-14N and management system 13 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 11 are described herein in more detail, and may vary with each particular embodiment. Each of the host computers 14A-14N, the management system 13 and data storage systems may all be located at the same physical site, or, alternatively, may also be located in different physical locations. In connection with communication mediums 12 and 15, a variety of different communication protocols may be used such as SCSI, fibre channel, iSCSI, FCoE and the like. Some or all of the connections by which the hosts, management system, and data storage system may be connected to their respective communication medium may pass through other communication devices, such as a Connectrix or other switching equipment that may exist such as a telephone line, a repeater, a multiplexer or even a satellite. In one embodiment, the hosts may communicate with the data storage systems over an iSCSCI or fibre channel connection and the management system 13 may communicate with the data storage systems over a separate network connection using TCP/IP. It should be noted that although FIG. 1 illustrates communications between the hosts and data storage systems being over a first connection, and communications between the management system 13 and the data storage systems being over a second different connection, an embodiment may also use the same connection. The particular type and number of connections may vary in accordance with particulars of each embodiment.

Each of the host systems may perform different types of data operations in accordance with different types of tasks. In the embodiment of FIG. 1, any one of the host systems 14A-14N may issue a data access request to the data storage systems 11 to perform a data operation. For example, an application executing on one of the host system 14A-14N computers may perform a read or write operation resulting in one or more data accesses to the data storage system 11.

The management system 13 may be used in connection with management of the data storage systems 11. The management system 13 may include hardware and/or software components. The management system 13 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 13. The manager may also configure a data storage system, for example, by using management software to define a logical grouping of logically defined devices, referred to elsewhere herein as a storage group ("SG"), and restrict access to the logical group.

It should be noted that although element 11 is illustrated as a single data storage system, such as a single data storage array, element 11 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 11 may include one or more data storage systems. Each of the data storage systems may include one or more data storage devices, such as disks. One or more data storage systems may be manufactured by one or more different vendors. Each of the data storage systems included in 11 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O access requests as may be issued by the host computer systems 14A-14N, for example, to the data storage systems 11.

It should be noted that each of the data storage systems 11 may operate stand-alone, or may also be included as part of a storage area network ("SAN") that includes, for example, other components such as other data storage systems.

Each of the data storage systems of element 11 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14A-14N, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of LVs. The LVs may or may not correspond to the actual disk drives. For example, one or more LVs may reside on a single physical disk drive. Data in a single storage system may be accessed by multiple hosts allowing the hosts to share the data residing therein. A LUN may be used to refer to one of the foregoing logically defined devices or volumes. An address map kept by the storage array may associate the host system logical address with the physical device address.

In such an embodiment, in which element 11 of FIG. 1 is implemented using one or more data storage systems, each of the data storage systems may include code thereon for performing the techniques as described herein. In following paragraphs, reference may be made to a particular embodiment such as, for example, an embodiment in which element 11 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 11 may also include other components than as described for purposes of illustrating the techniques herein.

The data storage system 11 may include any one or more different types of disk devices such as, for example, an Advanced Technology Attachment ("ATA") disk drive, Fibre Channel ("FC") disk drive, and the like. Thus, the storage system may be made up of physical devices with different physical and performance characteristics (e.g., types of physical devices, disk speed such as in Rotations Per Minute ("RPMs")), RAID levels and configurations, allocation of cache, processors used to service an I/O access request, and the like. The dynamic aspects of performance characteristics may include, for example, aspects related to current I/O performance such as Average Service Time ("AST") representing the average amount of time it takes to service an event (e.g., service an I/O access request), Average Response Time ("ART") based on the AST, and the average amount of time the I/O access request waits. Dynamic aspects may also include, for example, utilization of different data storage system resources (e.g., particular logical or physical devices, CPU), measurement of cache hits and/or misses, and the like. The dynamic aspects may vary with application workload, such as when particular applications may be more heavily performing I/O operations.

Generally, an Auto-Tiering policy engine (also referred to herein as PE) of the data storage system 11 examines policies, e.g., a storage pool's storage configuration and temperatures of all data slices in that storage pool, and generates a data slice relocation list. The data slice relocation list identifies data slices to be relocated with respective destination information. In general, data slices in a storage pool are matched to the most appropriate respective tiers based on their respective temperatures (e.g., hot, cold) and tier preferences (e.g., High, Low, Optimal). If a data slice's current tier differs from its matching tier, the data slice is listed in the relocation candidate list.

Figure 2:
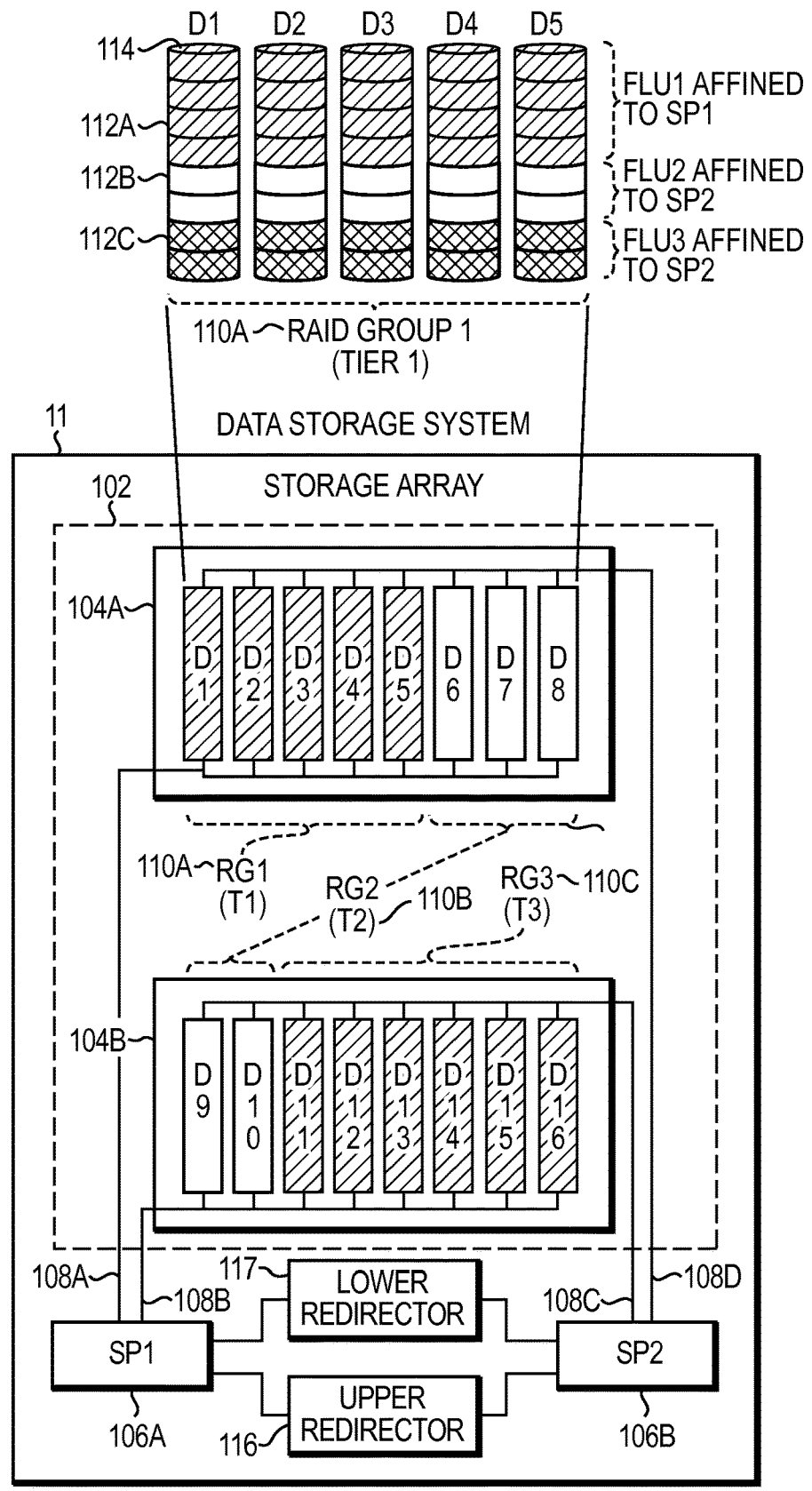
FIG. 2 is an example of an embodiment of a storage array that may utilize the techniques described herein.

Referring to FIG. 2, shown is an example of an embodiment of a data storage system that may be used in connection with performing the techniques described herein. FIG. 2 shows a data storage system 11 that comprises a storage array 102. Storage array 102 includes multiple physical devices D1-D16, which are typically hard disk drives, but which may be tape drives, flash memory, flash drives, other solid state drives, or some combination of the above. Physical devices D1-D16 may have various differences in capabilities based on physical characteristics of underlying storage media, e.g., flash memory may be extremely fast compared to tape storage which may be relatively large and cheap. As used herein, storage media may also be referred to as physical media and physical devices may also be referred to as storage devices. Storage media may include any of various computer readable media, e.g., hard disks, floppy disks, disks, tapes, discs, solid state memory, optical discs, and flash memory. In at least one embodiment, physical devices D1-D16 may be organized into tiers or classes of storage based on characteristics of associated storage media. For example, flash-based storage device D1-D5 may be "Tier 1" storage, hard disk-based storage device D6-D10 may be "Tier 2" storage, and tape-based storage devices D11-D16 may be "Tier 3" storage.

In at least one embodiment, the physical devices D1-D16 may be organized into multiple shelves 104, each shelf containing multiple devices D1-D16. In the embodiment illustrated in FIG. 2, storage array 102 includes two shelves, Shelf1 104A and Shelf2 104B; Shelf1 104A contains eight storage devices, D1-D8, and Shelf2 also contains eight storage devices, D9-D16. Data storage system 11 may include one or more storage processors 106, for handling I/O access requests and allocations of hosts or server systems. Each storage processor 106 may communicate with physical devices D1-D16 through one or more data buses 108.

In at least one embodiment, data storage system 11 includes a set of storage processors, such as two storage processors, SP1 106A, and SP2 106B, and each storage processor 106 has a dedicated data bus 108 for each shelf 104. For example, SP1 106A is connected to each physical device D1-D8 on Shelf1 104A via a first data bus 108A and to each storage device D9-D16 on Shelf2 104B via a second data bus 108B. SP2 106B is connected to each physical device D1-D8 on Shelf1 104A via a third data bus 108C and to each physical device D9-D16 on Shelf2 104B via a fourth data bus 108D. In this manner, each physical device D1-D16 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device D1-D16 is connected via some data bus to both SP1 106A and SP2 106B. The configuration of storage array 102 and the data storage system 11, as illustrated in FIG. 2, is for illustrative purposes only, and is not considered a limitation of the current technique described herein. It should be noted that storage array 102 may include more than two storage processors.

In addition to the physical configuration, physical devices D1-D16 may also be logically configured. For example, multiple physical devices D1-D16 may be organized into redundant arrays. In at least one embodiment, redundant arrays comprise RAID groups, or RGs 110, shown in FIG. 2 as RG1 110A, RG2 110B, and RG3 110C. RGs may be created or based on a various factors, including proximity of physical devices, utilization goals, capacity needs, physical characteristics of physical devices D1-D16, and other factors. In at least one embodiment, RGs are based on tiers generally determined by physical characteristics of physical devices (e.g., fast, high quality devices D1-D5 may be Tier 1 physical devices, and, as such, may be organized into a given RG 110). Such physical characteristics of physical devices for determining tiers may include but are not limited to capacity of physical device, access speed of physical device (e.g., RPM for disk-based media and throughput for solid state media), and type of physical device (e.g., flash, hard disk, and floppy).

In the embodiment illustrated in FIG. 2, physical devices D1-D5 are Tier 1 storage. D1-D5 are organized into a first RAID group, RG1 110A. Physical devices D6-D10 are Tier 2 storage. D6-D10 are organized into a second RAID group, RG2 110B. Physical devices D11-D16 are Tier 3 storage. D11-D16 are organized into a third RAID group, RG3 110C. In at least one embodiment, a RAID group may span multiple shelves and/or multiple buses. For example, RG2 110B includes physical devices from both Shelf1 104A and Shelf2 104B.

Although RAID groups are composed of multiple physical devices, a RAID group may be conceptually treated as if it were a single physical device. As used herein, the term "storage entity" may refer to either a single physical device or a RAID group operating as a single physical device. In at least one embodiment, storage entities are associated with tiers or classes of storage. Storage entities may be further sub-divided into logical units. A single RAID group or individual physical device may contain one or more logical units. In at least one embodiment, data slices are logical units or portions therein, of storage area. As used herein, storage area refers to storage space of one or more storage entities in a storage system. Data slices may be any size and may be associated with storage media from one or more storage entities. In at least one embodiment, data slices are constant-sized portions of storage associated with one storage device D2, or a storage media therein, in storage array 102 (e.g., a one GB slice from D2).

In the embodiment illustrated in FIG. 2, RG1, which includes physical devices D1-D5, is sub-divided into 3 logical units, or FLUs such as FLU1 112A, FLU2 112B, and FLU3 112C. Each FLU 112 is sub-divided into multiple data slices 114.

A pool of physical devices D1-D16 is organized into multiple RAID groups 110, and each RAID group is further divided into a number of LUs. Data slices may be allocated to one or more MLUs for use by users of storage array 102.

In at least one embodiment, storage processors 106 may be responsible for reserving and allocating storage space. Additionally, storage processors 106 may maintain information about the reserved and/or allocated storage space.

As described above, depending upon the physical characteristics of the data storage system, the collections of resources may have physical, electrical, or logical constraints on their use. Referring to FIG. 2, for example, in at least one embodiment of the current technique, a FLU 112 may span multiple storage entities, depending on the configuration of storage array 102 and configuration of the FLU 112.

Physical devices 120 may be organized into multiple RAID groups 110, where each RAID group may be further divided into a number of FLUs from which data slices 114 are allocated. Data slices that are allocated may be physically located anywhere in storage array 102. As will be discussed in more detail below, these data slices 114 may be located more or less contiguously, but they may also be distributed more or less evenly across all physical resources, depending on the data slice selection and allocation policy.

The data storage system 11 may also include redirectors 116, and 117. A redirector facilitates a storage access request presented to one SP 106 to travel to another SP 106. For example, in one embodiment, an I/O access request may be presented to SP1 106A. SP1 sends the I/O request through lower redirector 117, which forwards the request to SP2 106B. SP2 106B accesses the data slice 114 and completes the I/O access by returning any I/O through lower redirector 117 to SP1 106A.

Figure 3:
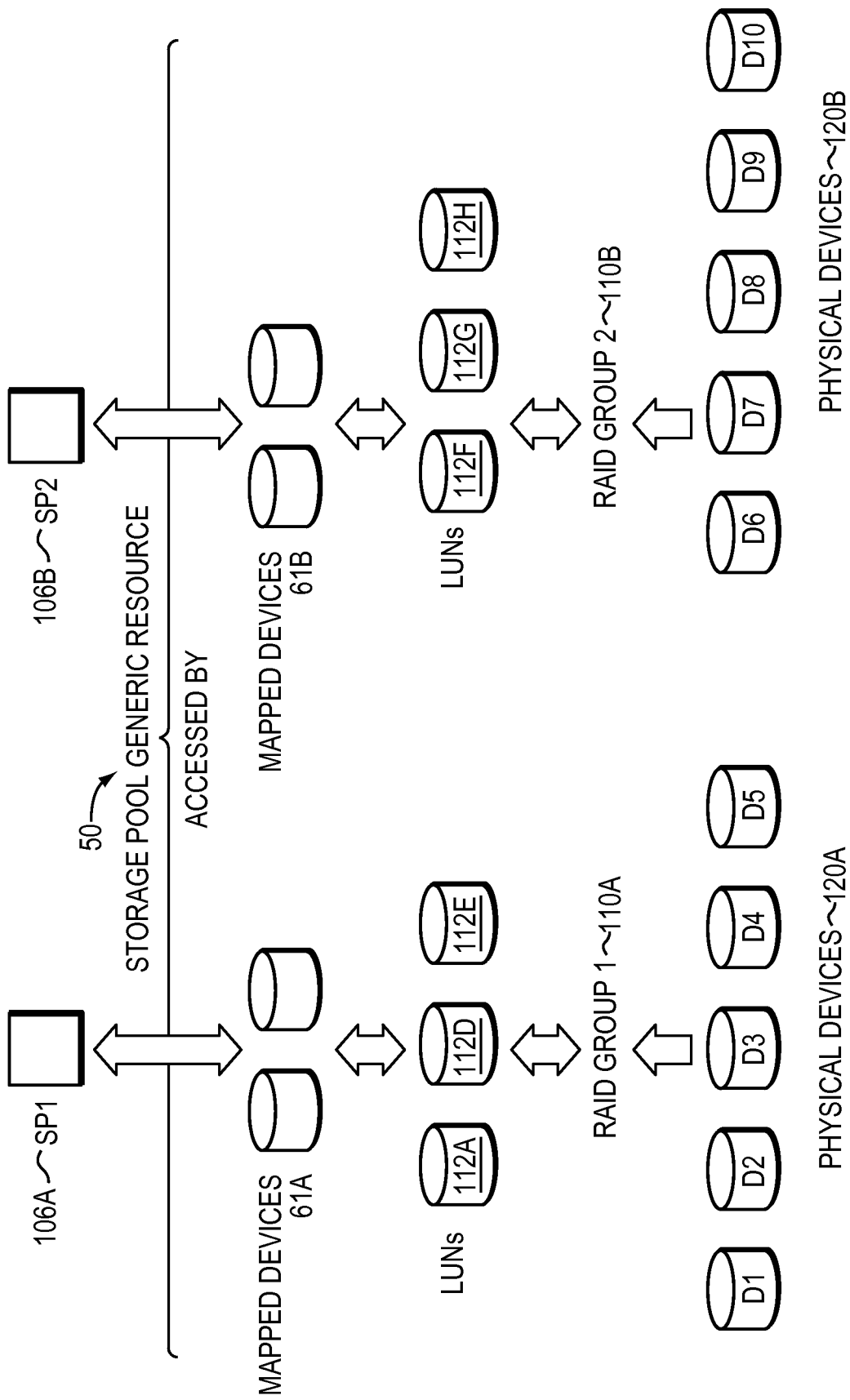
FIG. 3 is an example of an embodiment illustrating a storage device layout.

Referring to FIG. 3, shown is an example representing how data storage system best practices may be used to form storage pools. FIG. 3 illustrates how a storage pool 50 may be constructed from groups of physical devices 120. For example, RAID Group1 110A may be formed from physical devices 120A. The data storage system best practices of a policy may specify the particular disks and configuration for the type of storage pool being formed. For example, for physical devices 120A on a data storage system, when forming a storage pool, RAID-5 may be used in a 4+1 configuration (e.g., 4 data drives and 1 parity drive). The RAID Group 1 110A may provide a number of data storage LUNs 112A. An embodiment may also utilize one or more additional logical device layers on top of the LUNs 112A to form one or more logical device volumes. The particular additional logical device layers used, if any, may vary with the data storage system. It should be noted that there may not be a 1-1 correspondence between the LUNs 112A, 112D, and 112E, and the mapped devices 61A. The storage pool 50 illustrates two RAID groups being used to define a single storage pool although, more generally, one or more RAID groups may be used to form a storage pool in an embodiment using RAID techniques.

The storage pool 50 may also include one or more mapped devices 61A-61B. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices that map logical storage space of the data device to physical storage space on the physical devices 120A-120B. Thus, an access of the logical storage space of the mapped device results in either a null pointer (or equivalent) indicating that no corresponding physical storage space has yet been allocated, or results in a reference to a data device which in turn references the underlying physical storage space.

Figure 4:
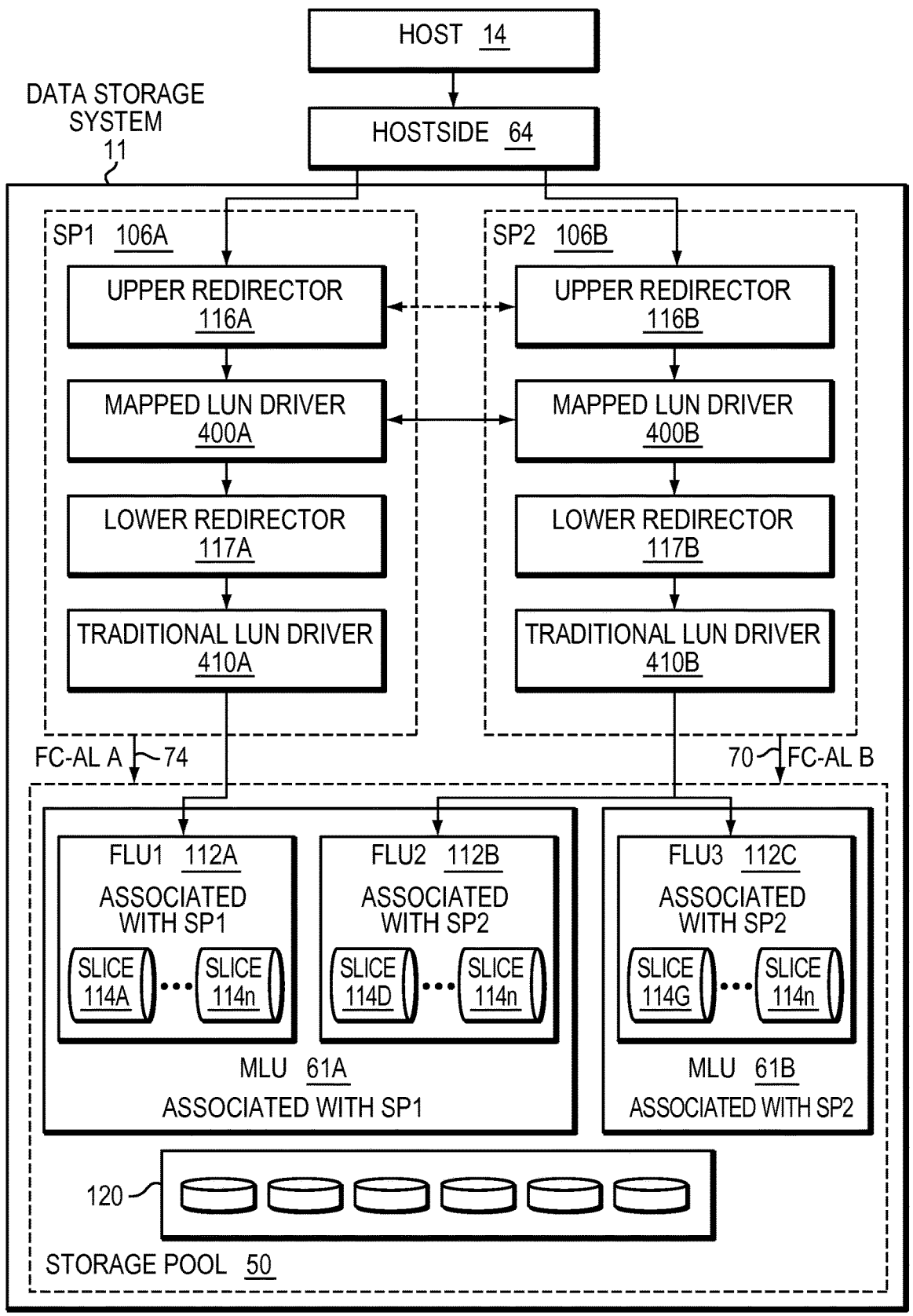
FIG. 4 is an example of an embodiment of a storage array that may utilize the techniques described herein.

Referring to FIG. 4, shown is a more detailed representation of components that may be included in an embodiment using the techniques herein. In a data storage system such as data storage system 11, a storage processor provides communications between host system 14 and physical devices 120. Data storage system 11 includes at least two storage processors 106A, 106B. Storage processor, SP1 106A, accesses the physical devices 120 using fibre channel communication loop FC-AL 74 and storage processor, SP2

106B, accesses the physical devices 120 using fibre channel communication loop FC-AL 70.

Host system 14 may not address the disk drives of the storage systems directly, but rather accesses to data may be provided to one or more host systems from what the host systems view as a plurality of LUNs. Host system 14 sends a request to host-side logic ("host-side") (e.g., host-side 64) to access data stored on logical devices. The host-side sends appropriate status back to the host system in case access to data fails. The LVs may or may not correspond to the physical disk drives. For example, one or more LVs may reside on a single physical disk drive. Data in a single data storage system 11 may be accessed by multiple hosts allowing the hosts to share the data residing therein. Regarding terminology related to a storage system, the host or host network is sometimes referred to as the front end and from disk adapters toward the disks is sometimes referred to as the back end. A disk adapter is a component that allows disk drives to communicate with a storage processor.

In at least some systems, the local SP is primarily responsible for all communications with a set of associated MLUs, which are associated with a set of traditional LUNs, such as FLUs, which are created using physical devices 120 in a data storage system. Each FLU 112 is logically divided into a set of data slices 114. One or more other SPs may be primarily responsible for all communications with other sets of MLUs and FLUs associated with physical devices in the data storage system 11. A MLU is said to be associated with a local SP, and the local SP is said to be the owner of the MLU. Additionally, FLUs are associated with SPs. A local SP is referred to as the owner SP of a set of FLUs associated with it, as well. When a FLU is associated with the same local SP to which an MLU that includes the FLU is associated with the same local SP, an optimal access path is achieved because no additional actions of lower redirector 117 are necessary to access the storage space of the physical devices 120 associated with the FLU. For example, referring to FIG. 4, MLU 61A is associated with SP1. MLU 61A has logically mapped FLUs 112A and 112B. In the above example, when FLU 112A is initially created, it is associated with a local SP such as SP1 106A. In such an example, since both the MLU 61A and the FLU 112A are associated with SP1 106A, the access path is said to have matching SP association or ownership.

Again referring to FIG. 4, FLU 112B is associated with SP2 106B. Since MLU 61A is associated with SP1 106A, but FLU 112B is associated with SP2 106B, the access path is said to have mismatching SP association or ownership. For example, an I/O access request directed to data slice 114D of MLU 61A begins at SP1 106A, traverses through the upper redirector 116A, to the mapped LUN driver 400A to the lower redirector 117A, whereupon it must traverse to the second lower redirector 117B, in order to access traditional LUN driver 410B to access the data slice 114D of FLU2 112B on physical devices 120. In this embodiment, the additional access through the second lower redirector 117B results in additional latency in the I/O access to the data slice. Thus, using the techniques described above, matching SP ownership results in improved overall data storage access.

For example, host 14 sends an I/O access request through host-side 64 to storage processor SP1 106A. Based on the I/O access request, SP1 106A sends corresponding data access requests to physical devices 120 through upper redirector 116A, mapped LUN driver 400A, lower redirector 117A, and traditional LUN driver 410A. Upper redirector 116A and lower redirector 117A enable the data storage system to provide alternate paths to a set of disk drives by redirecting I/Os from SP1 to SP2. Traditional LUN driver 410A enables the data storage system to interact with physical devices 120.

Storage processor SP2 106B services I/O access requests by sending the I/O access requests to physical devices 120 through upper redirector 116B, mapped LUN driver 400B, lower redirector 117B, traditional LUN driver 410B, data slices 114 and communication loop FC-AL B 70.

In another embodiment, during initial configuration, data storage may not be available in FLUs associated with the local SP. Data storage may be available in a FLU associated with a remote SP. The data storage in such a case is allocated from the remote SP's associated FLU. During a data relocation process, data storage may become available. In at least one embodiment of the current technique, the data slice can be relocated to the local SP, resulting in an optimized I/O access path.

In another embodiment, a data slice may change temperature over time. As a result, relocating the data slice may improve data storage performance by relocating a cold slice to a lower tier, or a hot slice to a higher tier, for example. During the relocation, data storage may be available on both a local SP and a remote SP. By taking the SP ownership into consideration during the relocation, the data slice may be relocated to the local SP data storage, further improving I/O performance.

Figure 5A:
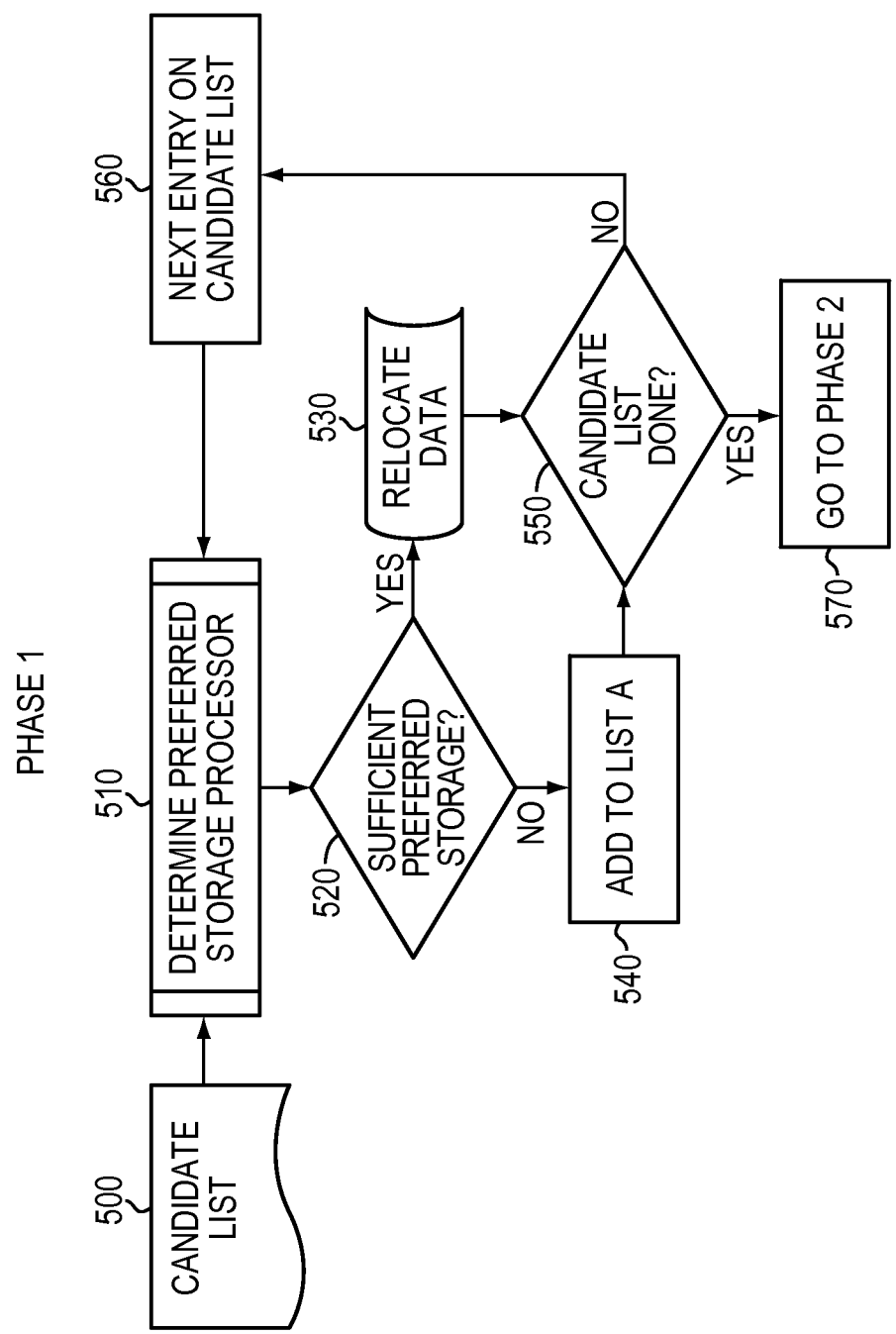
FIGS. 5A-C are flow diagrams illustrating processes that may be used in connection with techniques herein.
Figure 5B:
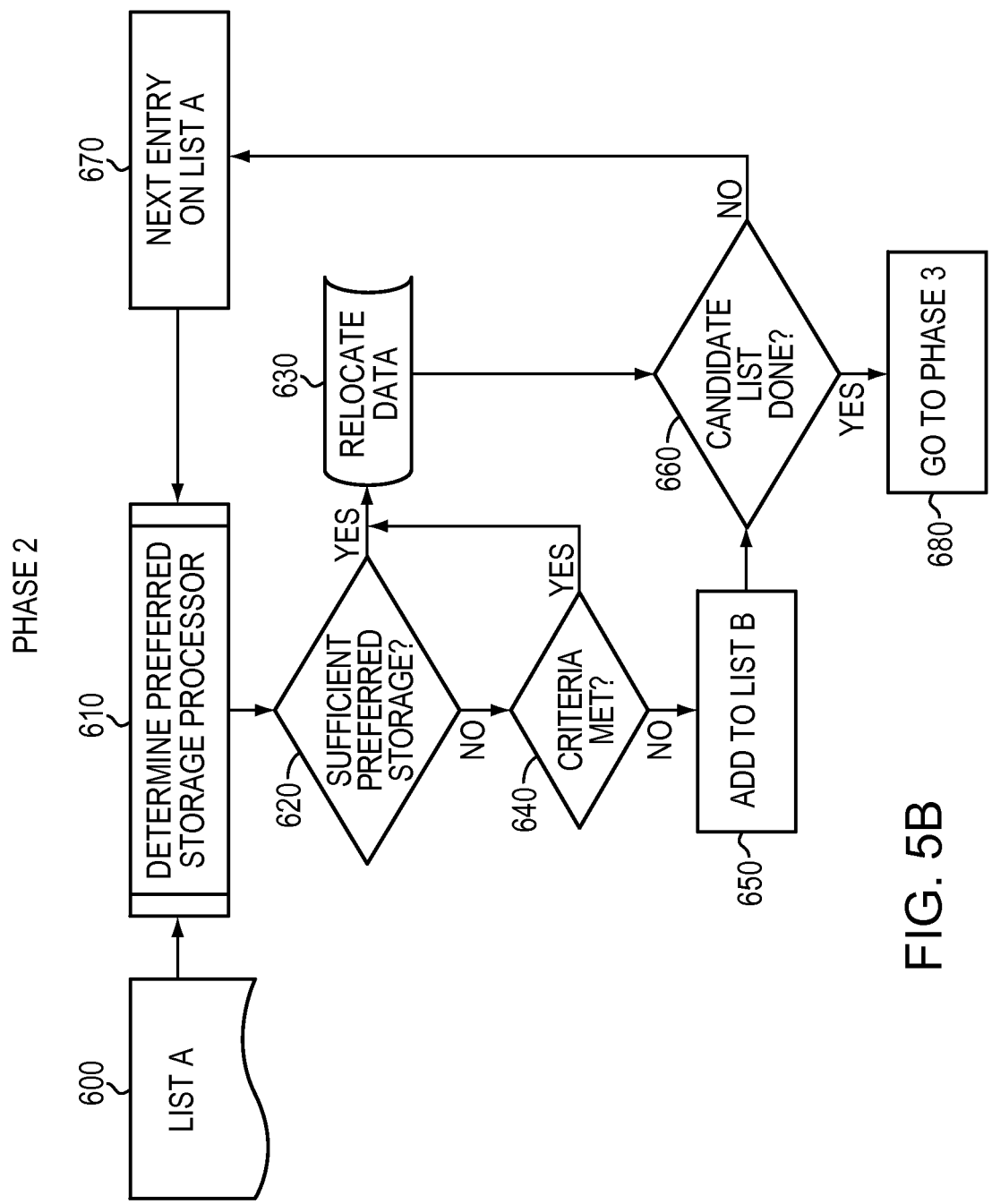
Figure 5C:
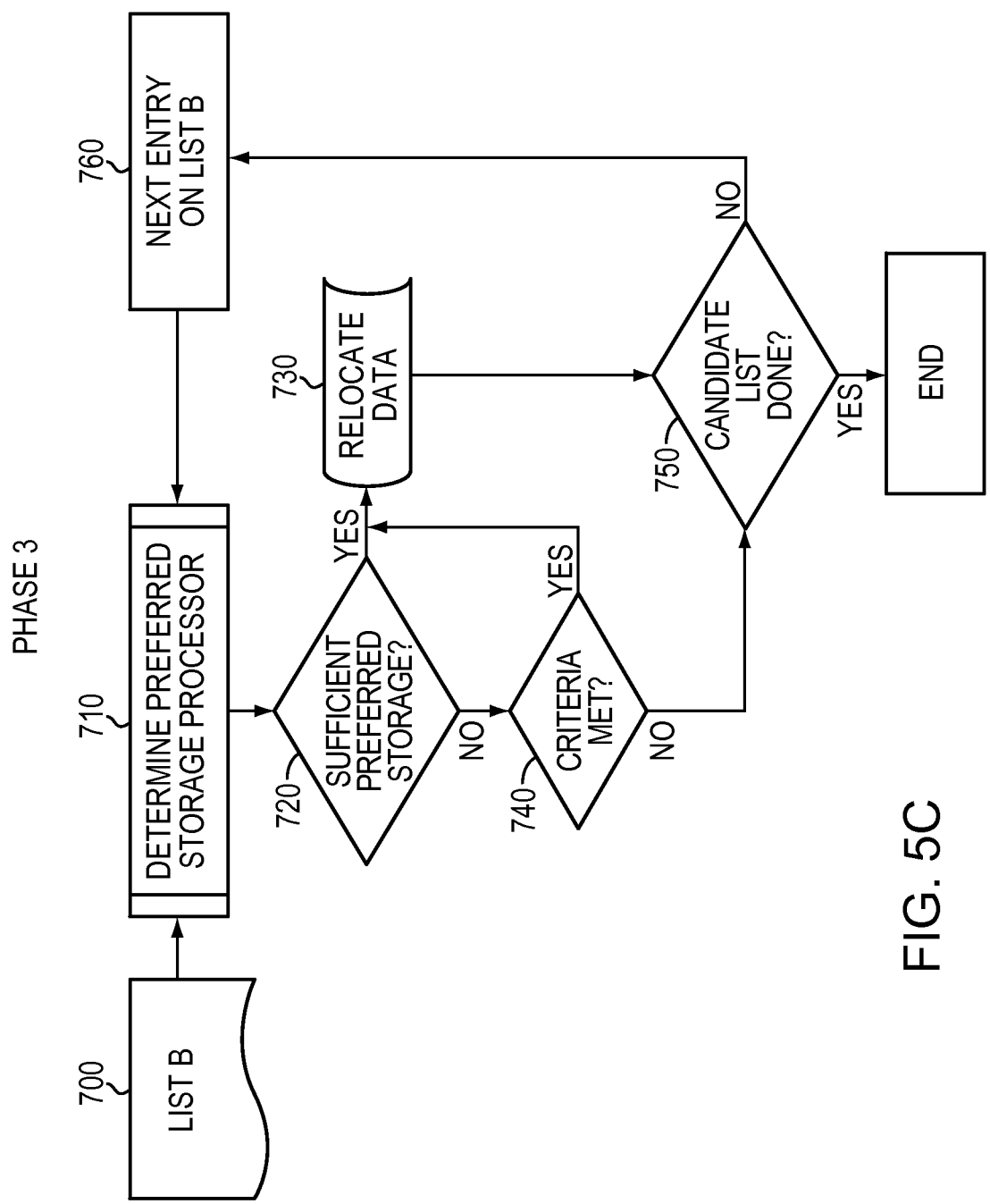

Referring to FIGS. 5A-C, relocating data storage in phases, using dynamic policies, improves data storage access performance. Data relocation, in one embodiment, occurs during data relocation windows of time. For example, a relocation window may occur once per day, during off-peak hours, in order to minimize the impact of the data relocation event. Referring to FIG. 5A, in one embodiment, a candidate list 500 is generated by the data storage relocation analysis using one or more policies. In the following example, a flexible policy is implemented in phases of data relocation. Each phase may implement different policies; hence the policies are flexible and change dynamically depending on the phase. In at least one embodiment, the first phase strictly enforces relocation of data slices to data slices with matching MLU and FLU associations to the local SP only. A data slice is not relocated if there is no available empty data storage meeting the criteria, rather than relocating the data slice to a location with mismatched MLU and FLU associations. For example, in at least one embodiment, the local SP is determined and is referred to as the preferred storage processor 510. The data storage destination is examined to determine whether sufficient data storage, associated with the local or preferred SP, is available 520. If sufficient data storage is available, the data from the candidate list 500 is relocated 530 to the data storage associated with the local SP. If no data storage is available, the candidate is placed on a second candidate list, List A 540. The next candidate from the candidate list 500 is evaluated using the same technique as described above. This process continues until every candidate on the candidate list 500 is evaluated, and then phase 2 begins.

Referring to FIG. 5B, in another example as now described, the flexible policy, from the previous example, still includes matching data storage to the local SP for data relocation, but in the second phase, upon failing to have available local SP data storage available, allows data relocation to a remote SP if alternative or additional criteria are met. In the example, a candidate from List A 600 is evaluated to determine the local SP 610. The data storage associated with the local SP is examined to determine whether sufficient data storage is available 620. If sufficient data storage is available, the data from the candidate list A 600 is relocated 630 to the data storage associated with the local SP. If no data storage is available, the data storage associated with the remote SP is examined to determine whether certain criteria are met 640. In at least one embodiment, criteria are updated on a timed interval, such as hourly. In one embodiment, the criterion is whether the candidate data is cold. If it is cold, relocating 630 the candidate data to the remote SP associated data storage is allowed because the cold data is accessed infrequently. Since the cold data access is infrequent, the resulting access latency impact is minimal. In another embodiment, the criterion is whether the data storage tier is a high speed tier. If it is a high speed tier, relocating 630 the candidate data to the remote SP associated data storage is allowed because the high speed tier has minimal latency because it is a high speed tier with a faster access speed than a low tier. Since the latency is minimized by the high speed devices, the additional latency of association with a remote SP is negligent. If none of the criteria are met, the candidate is placed on a third candidate list, List B 650. The next candidate from List A 600 is evaluated using the same technique as described above. This process continues until every candidate on List A 600 is evaluated, and then phase 3 begins.

Referring to FIG. 5C, in another example as now described, the flexible policy from the previous example still includes matching data storage to the local SP for data relocation, but in the third phase, upon failing to have available local SP data storage available, allows data relocation to a remote SP if alternative criteria are met. In the example, a candidate from List B 700 is evaluated to determine the local SP 710. The data storage associated with the local SP is examined to determine whether sufficient data storage is available 720. If sufficient data storage is available, the data from List B 700 is relocated 730 to the data storage associated with the local SP. If no data storage is available, the data storage associated with the remote SP is examined to determine whether certain criteria are met 740. In one embodiment, the criterion is whether the candidate data is cold. If it is cold, relocating 730 the candidate data to the remote SP associated data storage is allowed because the cold data is accessed infrequently. Since the cold data accesses are infrequent, the resulting access latency impact is minimal. In another embodiment, the criterion is whether the data storage tier is a high speed tier. If it is a high speed tier, relocating 730 the candidate data to the remote SP associated data storage is allowed because the high speed tier has minimal latency because it is a high speed tier with a faster access speed than a low tier. Since the latency is minimized by the high speed devices, the additional latency of association with a remote SP is negligent. If none of the criteria are met, the candidate is not relocated. The next candidate from List B 700 is evaluated using the same technique as described above. This process continues until every candidate on List B 700 is evaluated. The process begins again in phase 1, FIG. 5A, during the next data relocation window.

Allowing the policies to change dynamically improves the overall performance of the data storage system 11. Only three phases are described using the above technique for the purposes of illustration. Those skilled in the art will recognize that a different number of phases may be applied. Further, it will be appreciated by those skilled in the art that any number of criteria may be applied using the above technique. Additionally, it will be appreciated by those skilled in the art that this is for purposes of illustration and should not be construed as a limitation of the techniques herein. As will be appreciated by those skilled in the art, the data storage system 11 may also include other components than as described for purposes of illustrating the techniques herein.

Figure 6A:
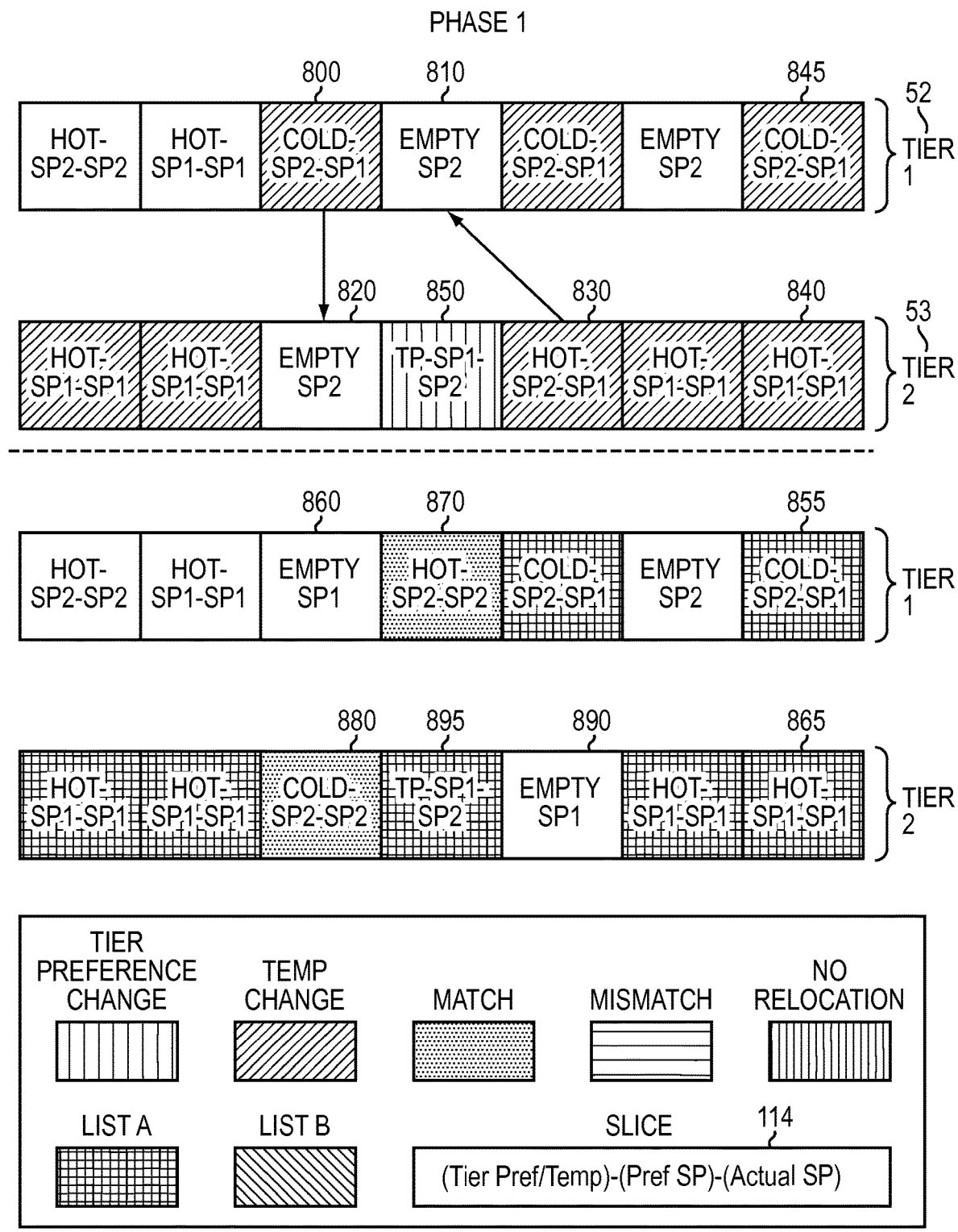
FIGS. 6A-C are diagrams illustrating an example representation of the relocation of slices that may be used in connection with techniques herein.
Figure 6B:
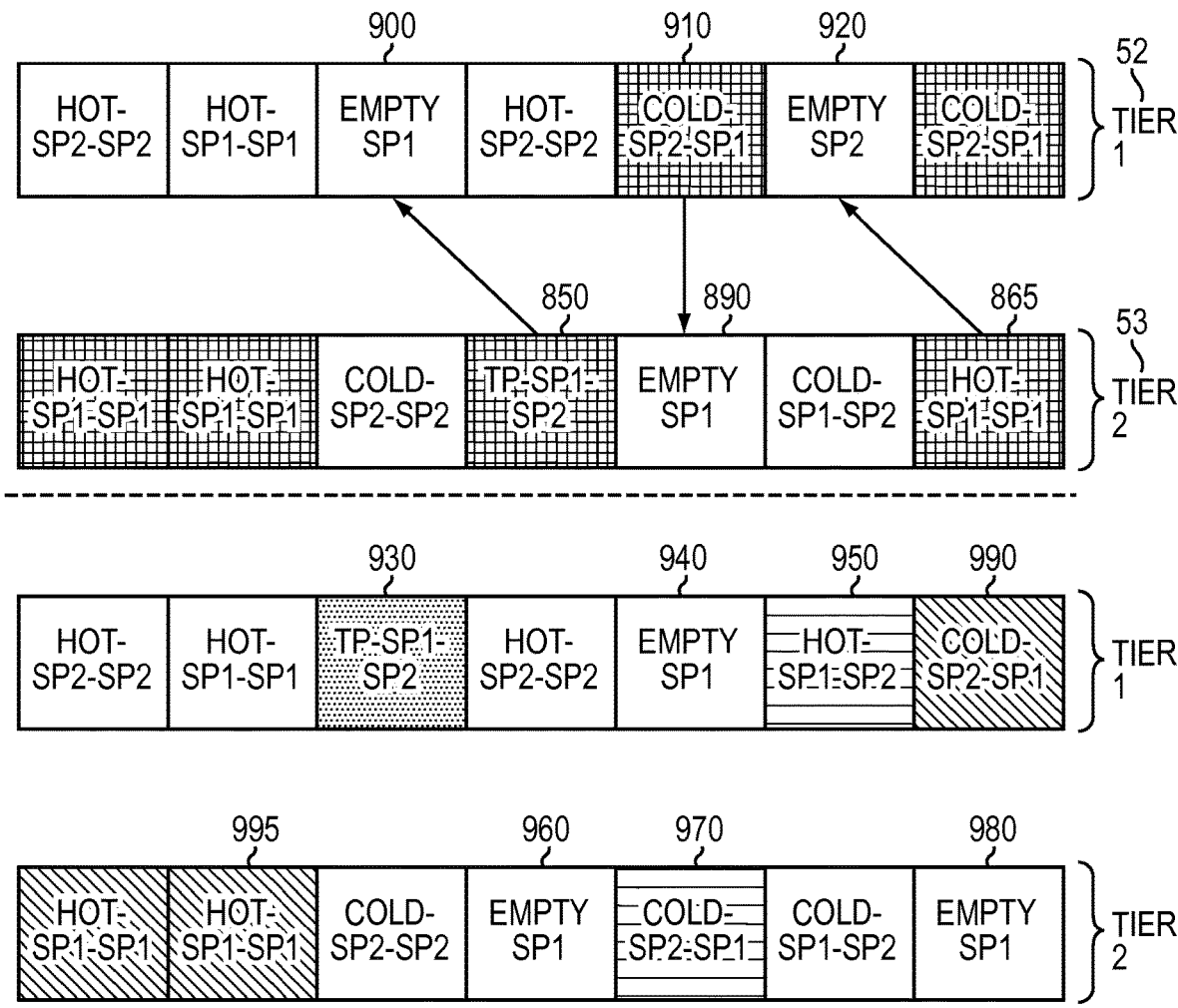
Figure 6B:
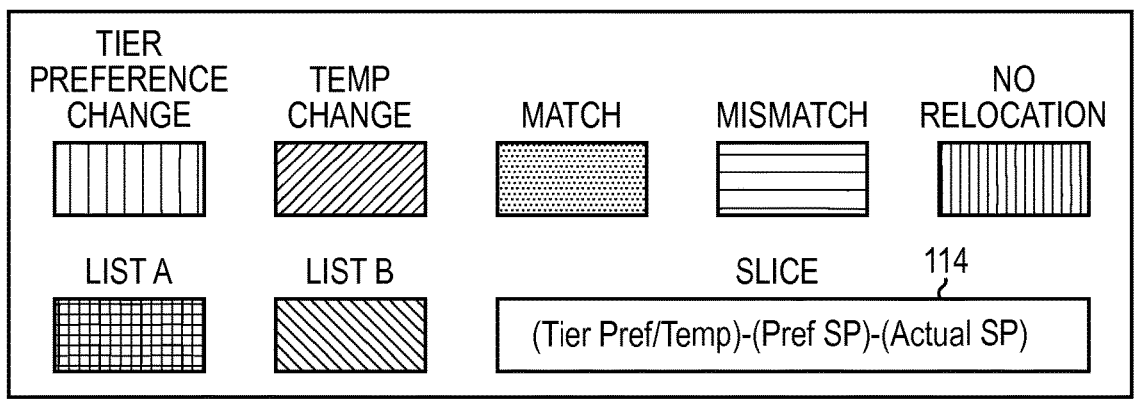
Figure 6C:
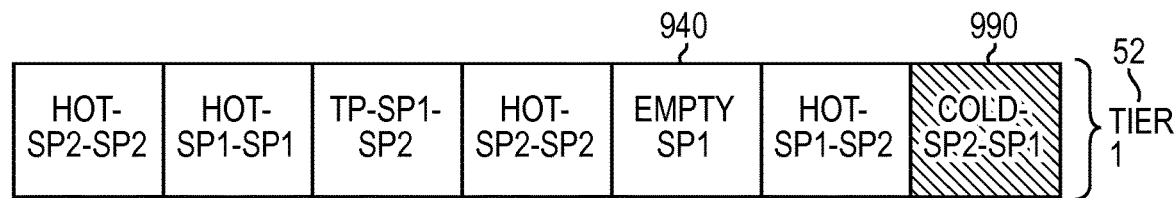
Figure 6C:
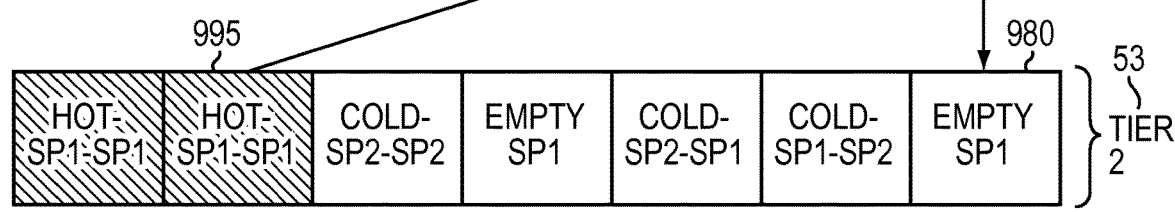
Figure 6C:
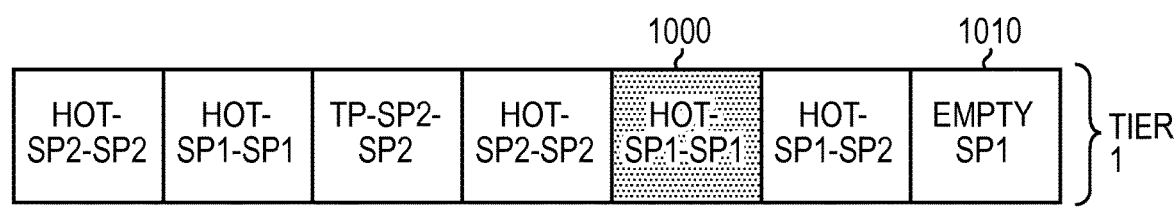
Figure 6C:
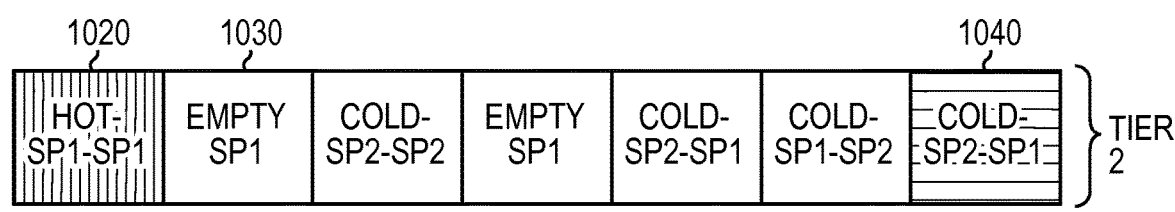
Figure 6C:
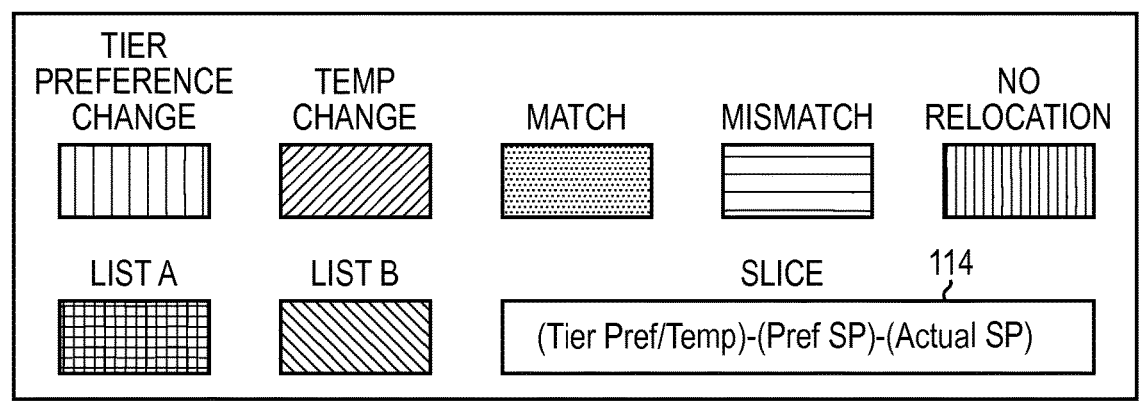

Referring to FIGS. 6A-C, one embodiment utilizing the techniques described above is illustrated. Referring to FIG. 6A, data slices are referred to by three indicators: (Tier Preference/Temp)-(Preferred SP)-(Actual SP). The first indicator refers to the data slice as either "HOT", "COLD", "EMPTY", or "TP" (for tiering preference change). The second indicator refers to the preferred FLU association to an SP (such as SP1 or SP2). The third indicator refers to the location of the actual data slice within a FLU associated with an SP, either SP1 or SP2. Additionally, slices are illustrated as being on List A or List B, having a tier preference change, a temperature change, a match of FLU with MLU associated with the same local SP, a mismatch of FLU with MLU associated with different SPs, and no relocation action.

Referring to FIG. 6A, during Phase 1, data relocation candidates 800, and 845 are shown in Tier 1 52. Data relocation candidates 830, 840, and 850 are shown in Tier 2 53. Data slices 800 and 845 illustrate a temperature change from hot to cold. Also, data slices 830 and 840 illustrate a temperature change from cold to hot. Data slice 850 illustrates a user initiated change of the tiering preference. As a result, each of these slices was placed on the candidate list by the data relocation analysis. Data slices 810 and 820 are available data slices 114, also referred to as empty data slices, and are associated with SP2 106B. During this phase, each data slice is evaluated to determine a preferred relocation destination tier. A preferred relocation data slice is a data slice associated with its local SP. Referring to FIG. 6A, data slice 820 is associated or owned by SP2. Cold data slice 800 has two associations, its MLU association is SP2, and its FLU association is SP1 indicating that a MLU that includes a FLU including the data slice 800 is associated with SP2 and the FLU is associated with SP1. The preferred FLU association for cold data slice 800 is a destination tier associated with SP2 because data slice 800 belongs to the FLU associated with SP1, but the FLU is a part of the MLU which is associated with SP2, hence there is a mismatch in its current location. Next a determination is made whether the local SP, in this case SP2, has available data storage in the appropriate destination tier, such as empty data slice 820. Thus, data slice 800 is relocated to slice 820. Data slice 810 is associated with or owned by SP2. Hot data slice 830 has two associations, its MLU association is SP2, and its FLU association is SP1. The preferred FLU association for hot data slice 830 is a data slice associated with SP2, such as empty data slice 810. Data slice 810 is in a higher tier, Tier 1 52, and meets the criteria for the data relocation candidate that its resulting MLU association matches its FLU association. Thus, slice 830 is relocated to data slice 810.

After the relocation process, hot data slice 870 has matching MLU and FLU associations with SP2 and is located on a higher tier, Tier 1 52. Cold data slice 880 has matching MLU and FLU associations with SP2 and is located on a lower tier, Tier 2 53.

Referring to FIG. 6A again, in at least one embodiment, the tiering preference changed for data relocation candidate data slice 850. Evaluating data slice 850, its MLU association is SP1 and its FLU association is SP2. Thus, data slice 850 is said to have a mismatch, and would preferably be relocated to a data slice within a FLU associated with SP1 to match or align with the MLU associated with SP1. Referring to FIG. 6A, in Tier 1 52, no empty data slices are available with an association to or being in alignment with SP1. Thus, data slice 850 is placed on the second candidate list, List A, as illustrated by slice 895 and is not relocated during Phase 1. Since no other locations met the SP ownership matching criteria, all remaining data relocation candidates, for example, 845, 840, and 850, are added to List A, as illustrated by data slices 855, 865, and 895 respectively, and Phase 2 begins.

Referring to FIG. 6B, in at least one embodiment, the flexible policy requirements are dynamically changed and Phase 2 begins. List A candidates, as illustrated by slices 850, 865, and 910 are evaluated. Candidates, as illustrated by slices 850 and 865, are determined to have SP1 ownership. Available data slices 900 and 920 are available in Tier 1, and are owned by SP1 and SP2, respectively. Data slice 850, located on List A, is relocated to empty data slice 900 and results in a relocated data slice 930 having MLU SP ownership matching or aligning with FLU SP ownership.

Referring to FIG. 6B, in at least one embodiment, data slice 865, located on List A, is relocated to empty data slice 920 using a flexible policy implemented during Phase 2. If the policy from Phase 1 was implemented during Phase 2, data slice 865 would not be allowed to relocate because no matching SP empty slices are available; only a mismatched SP empty slice 920 is available. In the example, the flexible policy is dynamically changed during Phase 2 to allow a hot data slice to relocate to a higher tier, even though the MLU SP ownership does not match the FLU ownership. Since hot data slices are accessed frequently, performance may be improved by placing the hot data slice on a faster tier, Tier 1, even with misaligned or mismatched SP ownership.

In the example, data slice 865 is evaluated as being a hot data slice, and is also allowed to relocate during Phase 2. Data slice 865 is relocated to empty data slice 920. The relocated data slice 950 now has a mismatched SP ownership.

Referring to FIG. 6B, in at least one embodiment, data slice 910, located on List A, is relocated to empty data slice 890 using a flexible policy implemented during Phase 2. If the policy from Phase 1 was implemented during Phase 2, data slice 910 would not be allowed to relocate because no matching SP empty slices are available; only a mismatched SP empty slice 890 is available. In the example, the flexible policy is dynamically changed during Phase 2 to allow a cold data slice to relocate, even though the MLU SP ownership does not match the FLU ownership. Since cold data slices are accessed infrequently, overall data performance is minimally impacted by relocating the cold data slice to an empty slice with misaligned or mismatched SP ownership.

Referring to FIG. 6B, in at least one embodiment, data slice 910, located on List A, is evaluated and is discovered to reside within a FLU with SP2 as an associated owner. Tier 2 is evaluated and found to have empty data slice 890 within a FLU owned by SP1. Based on the flexible policy criteria, since the data slice 910 is determined to be cold, it is allowed to be relocated to the available data slice 890. Thus, cold data slice 910 is relocated to empty data slice 890 and becomes a cold data slice 970 with a mismatched ownership. Since there are no other available empty data slices in Tier 1, all other List A candidates are placed on retry candidate list, List B, for example, data slices 990, and 995 located on List B, for use during Phase 3. All data slices where data has been relocated are now labeled as empty data slices 930, 940, and 980, and are available during Phase 3.

During Phase 3, with reference to FIG. 6C, utilizing different flexible policies than during Phase 1, the candidate list, List B, is evaluated. Data slice 995 is determined to be a hot data slice within a FLU associated with SP1 ownership. Empty data slice 940 is determined to be available in Tier 1 within a FLU associated with SP1 ownership. Data slice 940 became available after data slice relocation during Phase 2 of data slice 910. Data slice 995 is relocated to data slice 940 and the relocated data slice 1000 has a matching FLU and MLU associated with SP1 ownership. Data slice 990 is determined to be a cold data slice with SP2 ownership. Empty data slice 980 is determined to be available in Tier 2 and has SP1 ownership. Data slice 980 became available after data slice relocation during Phase 2 of data slice 865. Data slice 990 is relocated to data slice 980 and the relocated data slice 1040 has mismatched SP ownership. The data slice is relocated even though it results in a mismatched SP ownership within the FLU based on the flexible policy allowing cold data transfers. Data slice 1020 is not relocated since no Tier 1 slices were available. Data slices 1030 and 1010 are now available for use during the next data relocation cycle.

In other embodiments, the system of the above-described embodiments may be implemented with a computer-readable media tangibly embodying a program of instructions executable by a computer. The system can also be a device with hardware modules constructed to perform the above-described embodiments.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

What is claimed is:

1. A method for use in managing data accesses in storage systems, the method comprising:

receiving a request to relocate a data slice of a logical volume, wherein the logical volume is included in a mapped logical volume, wherein the mapped logical volume is accessible to a user and comprises of a set of logical volumes, wherein each logical volume comprises of a set of data slices, wherein each data slice of the set of data slices is organized on a set of storage devices of a storage system, wherein storage space is allocated to the logical volume using data slices from the storage devices, wherein the storage system includes source and destination storage pools configured such that performance characteristics associated with the source storage pool is different from performance characteristics associated with the destination storage pool, wherein a logical object resides in the source storage pool;

determining a preferred storage processor from a set of storage processors of the storage system for relocating the data slice based on a policy, wherein determining the preferred storage processor includes determining an owner storage processor for the mapped logical volume, wherein the owner storage processor for the mapped logical volume processes data access requests for the mapped logical volume, wherein the preferred storage processor aligns storage processor ownership for the mapped logical volume, the logical volume included in the mapped logical volume, and the data slice allocated to the logical volume;

determining whether available storage space is associated with the preferred storage processor for relocating the data slice;

based on the determination that available storage space is associated with the preferred storage processor, relocating the data slice to a target logical volume residing on the destination storage pool, wherein an owner storage processor for the target logical volume matches with the preferred storage processor; and based on the determination that available storage space is not associated with the preferred storage processor, adding the data slice to a retry list for relocating the data slice during a next phase of a relocation process.

2. The method of claim 1, wherein each data slice of the set of data slices of the logical volume is a logical representation of a subset of physical disk storage.

3. The method of claim 1, wherein the logical volume includes a disk drive system comprising a plurality of Redundant Array of Inexpensive Disks (RAID) systems, each RAID system of the plurality of RAID systems having a first disk drive and a second disk drive.

4. The method of claim 1, wherein the logical volume is accessed by the set of storage processors of the storage system.

5. The method of claim 1, wherein the logical volume is allocated from storage space associated with at least one storage processor of the set of storage processors of the storage system, wherein the storage space resides in a storage tier.

6. The method of claim 1, further comprising:
determining I/O activity for the data slice; and
based on the I/O activity of the data slice, determining the temperature of the data slice.

7. The method of claim 1, wherein an auto-tiering policy engine identifies the preferred storage processor for relocating the data slice.

8. The method of claim 1, further comprising:
changing an access path of the logical volume based on the policy.

9. The method of claim 1, wherein the policy is evaluated in at least three phases based on a set of criteria.

10. A system for use in managing data accesses in storage systems, the system comprising a processor configured to:
receive a request to relocate a data slice of a logical volume, wherein the logical volume is included in a mapped logical volume, wherein the mapped logical volume is accessible to a user and comprises of a set of logical volumes, wherein each logical volume comprises of a set of data slices, wherein each data slice of the set of data slices is organized on a set of storage devices of a storage system, wherein storage space is allocated to the logical volume using data slices from the storage devices, wherein the storage system includes source and destination storage pools configured such that performance characteristics associated with the source storage pool is different from performance characteristics associated with the destination storage pool, wherein a logical object resides in the source storage pool;

determine a preferred storage processor from a set of storage processors of the storage system for relocating the data slice based on a policy, wherein determining the preferred storage processor includes determining an owner storage processor for the mapped logical volume, wherein the owner storage processor for the mapped logical volume processes data access requests for the mapped logical volume, wherein the preferred storage processor aligns storage processor ownership for the mapped logical volume, the logical volume included in the mapped logical volume, and the data slice allocated to the logical volume;

determine whether available storage space is associated with the preferred storage processor for relocating the data slice;

based on the determination that available storage space is associated with the preferred storage processor, relocate the data slice to a target logical volume residing on the destination storage pool, wherein an owner storage processor for the target logical volume matches with the preferred storage processor; and based on the determination that available storage space is not associated with the preferred storage processor, add the data slice to a retry list for relocating the data slice during a next phase of a relocation process.

11. The system of claim 10, wherein each data slice of the set of data slices is a logical representation of a subset of physical disk storage.

12. The system of claim 10, wherein the logical volume includes a disk drive system comprising a plurality of Redundant Array of Inexpensive Disks (RAID) systems, each RAID system of the plurality of RAID systems having a first disk drive and a second disk drive.

13. The system of claim 10, wherein the logical volume is accessed by the set of storage processors of the storage system.

14. The system of claim 10, wherein the logical volume is allocated from storage space associated with at least one storage processor of the set of storage processors of the storage system, wherein the storage space resides in a storage tier.

15. The system of claim 10, further comprising:
determine I/O activity for the data slice; and
determine, based on the I/O activity of the data slice, determine the temperature of the data slice.

16. The system of claim 10, wherein an auto-tiering policy engine identifies the preferred storage processor for relocating the data slice.

17. The system of claim 10 further comprising:
change an access path of the logical volume based on the policy.

18. The system of claim 10, wherein the policy is evaluated in at least three phases based on a set of criteria.

* * * * *